Jan. 1, 1929. Re. 17,182
S. McEWEN
METHOD OF CARBONIZATION OR DESTRUCTIVE DISTILLATION
Original Filed June 16, 1920
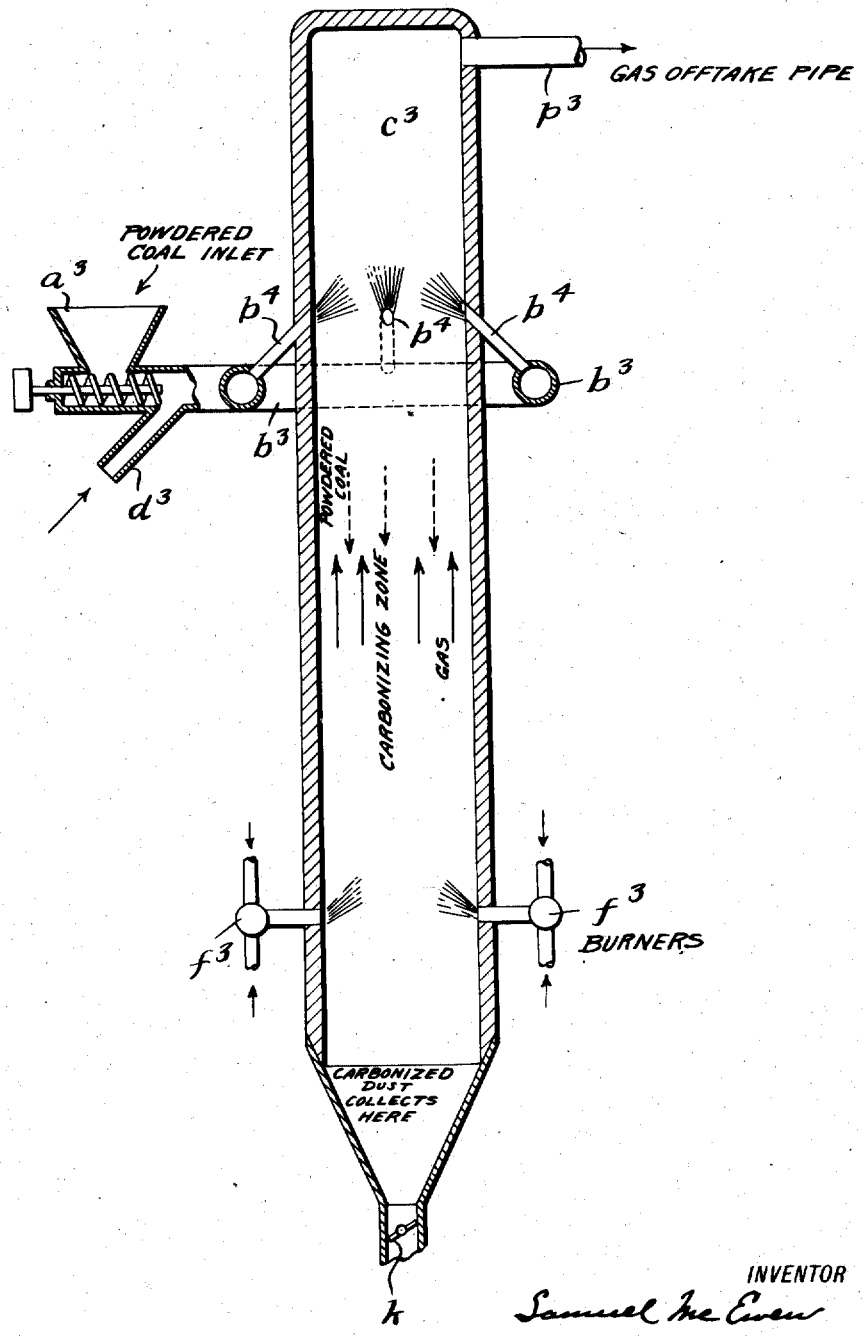
INVENTOR
Samuel McEwen
BY
Edwin A. Packard
HIS ATTORNEY Reissued Jan. 1, 1929. Re. 17,182

UNITED STATES PATENT OFFICE.

SAMUEL McEWEN, OF LONDON, ENGLAND, ASSIGNOR, BY MESNE ASSIGNMENTS, TO INTERNATIONAL COAL CARBONIZATION COMPANY, A CORPORATION OF DELAWARE.

METHOD OF CARBONIZATION OR DESTRUCTIVE DISTILLATION.

Original No. 1,481,140, dated January 15, 1924, Serial No. 389,399, filed June 16, 1920. Application for reissue filed February 11, 1925. Serial No. 8,563.

DIVISION B

This case is a divisional reissue of another reissue application based upon United States Letters Patent 1,481,140 granted to me on June 15, 1924, for an improved method for carbonization or destructive distillation, said another reissue application being reissued as the main reissue, because there is included in said main reissue claims generic to all species shown and described.

According to the invention of this divisional reissue, pulverized coal in finely divided form which is a finely sub-divided solid carbonizable fuel is fed into the upper portion of a carbonizing zone through which the coal particles thus fed gravitate in the form of a cloud, but are retarded in their downward passage due to upwardly rising hot gases maintained at the necessary temperature by heat supplied within the zone of carbonization. These upwardly rising hot gases move, as will be manifest, in a path counter to the gravitating coal particles and in a manner to delay the settling of the coal particles by gravitation until they have been subjected to the desired degree of distillation or carbonization. Ultimately the gases used in or of the process are withdrawn from the upper portion of the carbonizing zone, more specifically from the top or upper portion of a vertical carbonizing chamber or retort, and the residual carbonized products which are in the form of carbonized dust that collects at the bottom of the carbonizing zone are withdrawn as desired.

For a more full understanding as to the general description of the process and the field of its application one is referred to said main reissue filed of even date herewith and above identified, but as illustrative of a specific manner in which the process may be realized reference is made to the accompanying drawing forming part of this specification in which the sole figure shows a vertical retort or carbonizing chamber for performing the process.

In said figure there is shown a vertical carbonizing chamber or retort $c^3$ which is heated as by burning gas therein. In other words this chamber provides a defined carbonizing space within which the process is carried out. The chamber $c^3$ is surrounded at its upper part by an annular pipe $b^3$ supplied with powdered coal from a hopper $a^3$. Gases chemically inert with respect to the coal as for example some of the gases used for performing the process as modified by the gases resulting from the process may be returned as from a condensation plant (not shown) and as by means of a blower (not shown) to the annular pipe $b^3$ to carry the powdered coal through jets 4 into the chamber $c^3$. Jets $b^4$ form communication between the pipe $b^3$ and the interior of the chamber $c^3$ and lead to the carbonizing zone within the carbonizing chamber. It will be obvious that by the means just described pulverized coal is fed—viz blown or carried in a relatively uniform manner into the upper portion of the carbonizing zone whereby the coal particles can gravitate through and counter to upwardly moving hot gases. Into the lower portion of the chamber there extends the gas burners $f^3$ by which there is produced the heat for the rising hot gases that provide a hot elastic fluid by which the process is enabled to be realized. In other words the burners just described provide a means for maintaining the necessary temperature by heat supplied within the zone of carbonization. According to broader aspects of the species of the invention hereby sought to be protected it will be manifest that the heat may be supplied in other ways, as by systems involving the introduction of heat as shown in the main reissue application Serial No. 8,562 filed February 11, 1925, for example in the forms illustrated and described in connection with Figures 1 and 2 thereof.

At the top of the retort or chamber $c^3$ a gas offtake pipe $p^3$ conducts the volatile products of the process as well as the products from burners $f^3$ to a condensing plant, not shown, or otherwise as desired; or in other words the gases of the process and the hot gases introduced within the carbonizing chamber are conducted from the chamber $c^3$ by pipe $p^3$. The gas withdrawn through pipe $p^3$ is combustible, but it will be noted the gases that are actually employed for realizing the carbonization as well as the gases driven off during and/or resulting from the process are substantially chemically inert with respect to the coal, to wit, with respect to the fuel or material undergoing carbonization.

It will be manifest that some of the gas thus withdrawn or escaping through the pipe $p^3$ can be conducted to the burners $f^3$ to create products of combustion—or hot elastic fluid—that rise from said burners and that meet and contact directly with the particles of coal descending but maintained in suspension as above described. The carbonized dust—to wit, the solid carbonized residuals—collects at the bottom of the retort to be removed in any suitable manner as by periodically opening the discharge valve *k*. It will be manifest that the solid carbon residuals which deposit or collect at the bottom of the retort or carbonizing chamber can be periodically removed in the same chemical condition to wit the same chemical composition existing at the time of the lodgment or deposit; in other words, after their deposit or precipitation from the carbonizing zone there is practically no further gasification of or giving off of gases from the deposited carbonized dust, to wit, from the partially carbonized pulverized coal. From the specification, including the drawings, it will be noted that the heat for carrying out the carbonizing operation within the retort is introduced in or at the lower portion of the carbonizing zone but at a location above the place of deposit of the residual products or carbonized dust, lodged at the base of the carbonizing chamber or retort, with the consequent results that there is no further heat passing through the deposited material and no further gasification of the deposited material. It will also be noted that the deposited material is progressively and continuously covered by additional depositing material due to the continual and normal functioning of the process, viz, until the deposited material is purposely removed. The temperature of the system, and that of the treating gases, should be about 500 to 800° C. after the admission of the material to be carbonized. It will also be manifest that the invention can be realized in various modes without departing from the spirit and scope thereof.

What I claim is:

1. A process of carbonizing coal comprising feeding finely divided coal into the upper portion of a carbonizing zone through which the coal particles gravitate downwardly, causing a hot gaseous medium which is substantially inert with respect to the coal to travel upwardly through said zone to delay the settling of the particles by gravitation until they have been subject to carbonization while in suspension in the upwardly moving gaseous medium, maintaining the necessary temperature for accomplishing the carbonization by heat supplied within the zone of carbonization, withdrawing the gases of the process from the upper portion of the carbonizing zone, and withdrawing the residual products from the bottom in the form of carbonized dust, the heat supplied within the zone of carbonization being supplied at the lower portion of the zone of carbonization but at a location above the place of deposit of the residue products, the said residue products after deposit being kept free from substantial addition of heat.

2. A process of carbonizing coal and obtaining of carbonized dust comprising feeding pulverized coal into the upper portion of a carbonizing chamber within which the pulverized coal gravitates downwardly, causing hot gases which are substantially chemically inert with respect to the coal to travel upwardly in a manner to delay the settling of the coal while it is being subject to carbonization while in suspension in the hot gases, maintaining the necessary heat for the carbonizing within the carbonizing chamber, withdrawing gas of the process from the upper portion of the carbonizing chamber, and withdrawing from the bottom carbonized dust having the same chemical composition existing at the time of deposit at the lower portion of the carbonizing zone.

3. A process of carbonizing coal comprising feeding pulverized coal into the upper portion of a carbonizing zone through which the pulverized coal thus fed gravitates downwardly but is retarded in its downward passage due to upwardly rising hot gases which are substantially chemically inert with respect to the coal and which are maintained by combustion taking place within the lower zone of the retort, the coal being suspended in the rising hot gases during its gravitation through the carbonizing zone, withdrawing resulting gases from the upper portion of the carbonizing zone, and collecting precipitated coke from the lower portion, the combustion taking place within the lower zone of the retort being above the collected coke, and the collected coke being kept free from substantial addition of heat while within said retort.

4. The carbonizing of coal in a vertical carbonizing chamber by a process comprising feeding finely divided coal into an upwardly moving stream of hot elastic fluid resulting from the burning of air and gas in the lower region of the carbonizing chamber and allowing the products of combustion to move upwardly through the carbonizing zone under conditions whereby the hot elastic fluid causes the coal to be heated and to be subject to carbonization while suspended in the upwardly moving elastic fluid which effects a delay in the settling of the coal, withdrawing gases of the process from the upper portion of the carbonizing chamber, and collecting carbonized residue from the bottom, the burning of gas and air in the lower region of the carbonizing chamber being located above the carbonized residue lodged at the bottom, the lodged carbonized residue being kept free from substantial addition of heat while within the retort.

5. The carbonizing of coal in a vertical retort having an unobstructed carbonizing zone and within which the coal is carbonized while in suspension, which carbonizing of the coal is carried out by the process comprising feeding powdered coal into the upper portion of the carbonizing zone of the retort and within which carbonizing zone of the retort the temperature is about 500 to 800 degrees C. after the admission of the coal to be carbonized and within which the particles of coal descend meeting rising hot gases which are substantially chemically inert with respect to the coal whereby the particles of coal are heated by and while in suspension in the hot gases and which gases are caused to travel to delay the settling of the coal particles by gravitation and which are maintained at the necessary temperature for carbonization by heat furnished by gases supplied to the zone of carbonization, withdrawing from the upper portion of the retort the gases which include volatile products driven off from the coal particles during the direct heating of the coal particles by the rising hot gases, and removing from the retort the resulting carbonized dust which has precipitated out of the rising hot gases, the gases for supplying heat for the process being supplied interiorly of the retort to the lower portion of the zone of carbonization but at a place above the carbonized dust precipitated out of the rising hot gases, the carbonized dust being kept free from substantial addition of heat while within the lower portion of the retort.

6. The carbonizing of coal in a retort having a carbonizing zone and within which the coal is carbonized while in suspension which carbonizing of the coal is carried out by the process comprising feeding powdered coal into an upper end portion of the carbonizing zone of the retort and within which carbonizing zone of the retort the temperature is about 500 to 800 degrees C. after the admission of the coal to be carbonized and within which the particles of coal are maintained suspended by upwardly moving hot gases which are substantially chemically inert with respect to the coal whereby the particles of coal are heated by and while in suspension in the upwardly moving hot gases, withdrawing from the upper portion of the zone of carbonization gases which include volatile products driven off from the coal particles during the direct heating of the coal particles by the upwardly moving hot gases, and removing in finely subdivided state the carbonized coal thus produced after having passed downwardly through the carbonizing zone and after separation from the upwardly moving hot gases, the upwardly moving hot gases being maintained hot by heat supplied interiorly of the retort at a location above the place where the finely divided carbonized coal lodges after the precipitations from the upwardly moving hot gases, the finely divided carbonized coal being kept free from substantial addition of heat while within the retort.

7. A process of carbonizing finely sub-divided solid carbonizable fuel in a carbonizing chamber having walls within which there is a carbonizing zone comprising suspending the finely sub-divided fuel in a gas substantially chemically inert with respect to the fuel at a temperature necessary for carbonization of the fuel, which process includes burning of gases within the carbonizing zone, which burning is effected so that the products of combustion travel upwardly in the said zone in such manner as to delay settling of the particles by gravitation, removing gases from the upper portion of the carbonizing chamber and collecting and withdrawing in finely sub-divided state the carbonized fuel thus produced, the carbonized fuel thus collected being of substantially the same chemical composition as that which it had when leaving the carbonizing zone.

In witness whereof I hereunto sign my name.

SAMUEL McEWEN.